(No Model.)
C. H. HOUGHTON.
Hollow Building Block.
No. 240,718. Patented April 26, 1881.
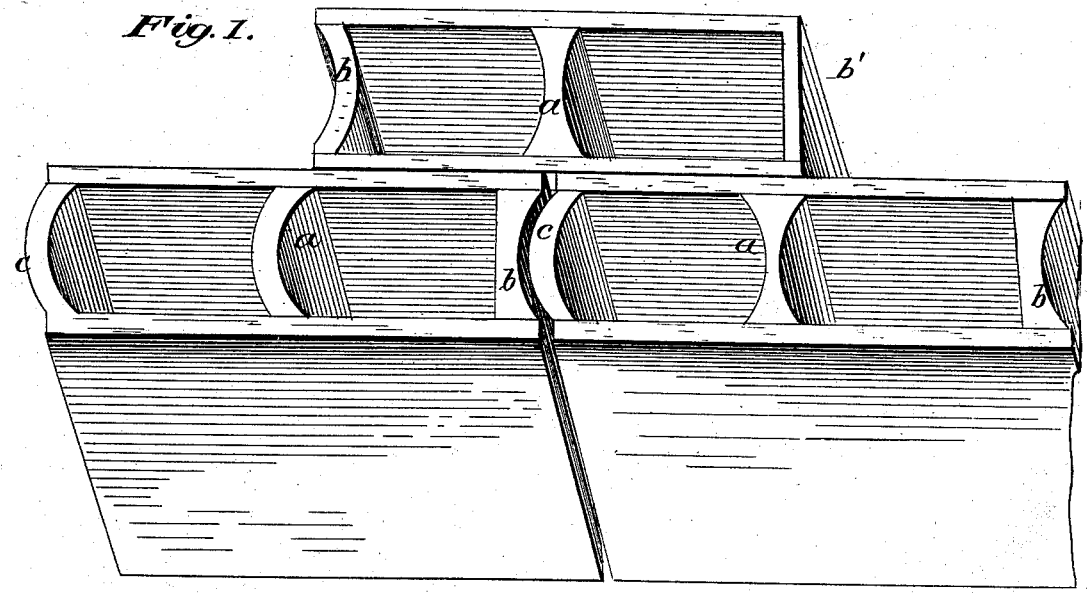
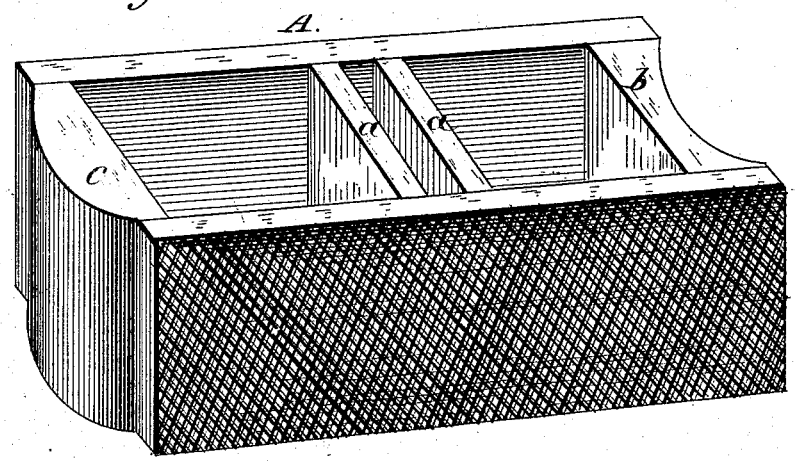
Witnesses
Fred. G. Dieterich
Joseph T. Power
Inventor:
Charles H. Houghton
by Louis Bagger & Co.
Attorneys

UNITED STATES PATENT OFFICE.

CHARLES H. HOUGHTON, OF PERTH AMBOY, NEW JERSEY.

HOLLOW BUILDING-BLOCK.

SPECIFICATION forming part of Letters Patent No. 240,718, dated April 26, 1881.

Application filed November 27, 1880. (No model.)

*To all whom it may concern:*

Be it known that I, CHARLES H. HOUGHTON, of Perth Amboy, in the county of Middlesex and State of New Jersey, have invented certain new and useful Improvements in Hollow Building-Blocks; and I do hereby declare that the following is a full, clear, and exact description of the invention, which will enable others skilled in the art to which it appertains to make and use the same, reference being had to the accompanying drawings, which form a part of this specification, and in which—

Figure 1 is a view showing two or more courses of my brick with differently-designed partitions and ends, and Fig. 2 is a perspective view of an individual brick or block.

This invention contemplates improvements in building bricks or blocks, having for its object to combine lightness, strength, and durability, with means or flues for ventilation, and which are adapted to serve as smoke-exits, or for the escape of odors or aromatic vapors from the kitchen, or infected or impure air from other parts or rooms of the house.

The nature of my invention consists of a building brick or block molded or made mainly hollow, with a strengthening or re-enforcing partition, and provided at one end with a suitable recess, and at the other end with a correspondingly-shaped extension, and having its inner surface roughened or serrated, substantially as will be hereinafter more fully set forth.

In the accompanying drawings, A marks the individual block or brick, molded or made mainly hollow, from the usual brick or plastic clay and sand, mixed in proper proportions, and hardened or "burned" in a kiln. The brick or block is also molded or made with a central partition or wall, *a*, to re-enforce or strengthen it, while one of its ends is provided with a curved or other suitably-shaped recess, *b*, and the other end with a correspondingly-shaped extension, *c*; or one of the ends may be made square, as shown at *b'*, for use at the corners of buildings. This construction produces the following results, viz: The ends of the bricks of the same course are caused to break joints with each other, and those of the bricks of one course are caused to break joints with those of the bricks of the next above and the next below course, while the interior spaces of the bricks, placed edgewise upon each other when building, form flues or passages in the walls of the building, adapted to serve, among other purposes, the following: With a registered opening in the wall in the basement or kitchen communicating with the flues, and an opening also registered in the wall (it may be near the eaves of the roof or at other suitable point) communicating with the external air, an upward current of air is produced, which will carry off the aromatic vapors or fumes of the kitchen, while, with opposite openings or openings in opposite walls, a current of air will be produced for ventilating the kitchen or basement. The duplication of this arrangement for each room will effect the ventilation of the same, and the carrying off impure or infected air, with a supply of fresh air maintained, thus acting as a sanitary medium for the house. In the warm weather this means of ventilation will also render the apartments or rooms more comfortable, or cooler. These flues also serve to conduct the smoke from a fire-place or stove-pipe, entering the wall, to its point of exit. As more or less heat ascends with the smoke, it will be seen that these also serve as heating-flues for the several or various rooms of the house, thus heating the latter in the cool weather, while, as above stated, they serve as a means of ventilation in the warm weather, thereby promoting the comfort of its occupants.

It will be observed that the corner bricks or blocks are made, as seen in Fig. 1, with one of their ends plain, and they may be configurated after the fashion of panels or otherwise ornamented. The surfaces of the bricks forming the inner walls of the house are roughened or incised to cause the plaster of the rooms to adhere thereto, thus dispensing with laths.

Having thus fully described my invention, I claim, and desire to secure by Letters Patent of the United States—

A hollow building-block having one recessed and one correspondingly-extended end, provided with re-enforcing partitions, and having one of its faces roughened or serrated, to hold plaster, substantially as set forth.

In testimony that I claim the foregoing as my own I have hereto affixed my signature in presence of two witnesses.

CHARLES H. HOUGHTON.

Witnesses:
J. KEARNY SMITH,
C. H. BOWER.